(12) United States Patent
Mazed

(10) Patent No.: US 8,073,331 B1
(45) Date of Patent: Dec. 6, 2011

(54) DYNAMIC INTELLIGENT BIDIRECTIONAL OPTICAL AND WIRELESS ACCESS COMMUNICATION SYSTEM

(76) Inventor: Mohammad A. Mazed, Yorba Linda, CA (US)

( * ) Notice: Subject to any disclaimer, the term of this patent is extended or adjusted under 35 U.S.C. 154(b) by 935 days.

(21) Appl. No.: 11/952,001

(22) Filed: Dec. 6, 2007

Related U.S. Application Data

(60) Provisional application No. 60/868,838, filed on Dec. 6, 2006, provisional application No. 60/883,727, filed on Jan. 5, 2007, provisional application No. 60/970,487, filed on Sep. 6, 2007.

(51) Int. Cl.
*H04Q 11/02* (2006.01)
*H04J 14/00* (2006.01)
*H04L 12/64* (2006.01)
*H01S 3/10* (2006.01)
*H01S 3/00* (2006.01)

(52) U.S. Cl. ........... 398/68; 398/66; 398/43; 398/45; 398/72; 370/420; 370/467; 370/430

(58) Field of Classification Search .......... 398/66, 398/68, 43
See application file for complete search history.

(56) References Cited

U.S. PATENT DOCUMENTS

| | | | |
|---|---|---|---|
| 6,320,867 B1 * | 11/2001 | Bellenger et al. | 370/420 |
| 2002/0018496 A1 * | 2/2002 | Gutin | 372/20 |
| 2003/0169481 A1 * | 9/2003 | Hwang et al. | 359/337.5 |
| 2003/0223104 A1 * | 12/2003 | Kinoshita et al. | 359/333 |
| 2004/0013429 A1 * | 1/2004 | Duelk et al. | 398/45 |
| 2004/0071402 A1 * | 4/2004 | Chang et al. | 385/40 |
| 2004/0141748 A1 * | 7/2004 | Spickermann et al. | 398/72 |
| 2004/0208576 A1 * | 10/2004 | Kinoshita et al. | 398/83 |
| 2005/0031342 A1 * | 2/2005 | Wu et al. | 398/32 |
| 2005/0207760 A1 * | 9/2005 | Onaka | 398/186 |
| 2006/0146855 A1 * | 7/2006 | Kani et al. | 370/430 |
| 2006/0220001 A1 * | 10/2006 | Uetake et al. | 257/14 |
| 2006/0233197 A1 * | 10/2006 | Elmoalem et al. | 370/468 |
| 2007/0009267 A1 * | 1/2007 | Crews et al. | 398/182 |
| 2007/0041384 A1 * | 2/2007 | Das et al. | 370/395.4 |
| 2007/0133990 A1 * | 6/2007 | Kim et al. | 398/72 |
| 2007/0147837 A1 * | 6/2007 | Yoo et al. | 398/72 |

\* cited by examiner

*Primary Examiner* — Shi K Li
*Assistant Examiner* — Oommen Jacob
(74) *Attorney, Agent, or Firm* — Kindred | Posey; Ivan Posey, Esq.

(57) ABSTRACT

According to one embodiment of the present invention, a wavelength-shifted dynamic intelligent bidirectional access optical system utilizes key optical elements such as: a quantum dot enabled semiconductor optical amplifier, a phase modulator and an intensity modulator to provide upstream optical signals. These key optical elements reduce the Rayleigh backscattering effect on the transmission of optical signals. to enable a longer-reach access network topology between a subscriber unit and a super node (e.g., many local nodes collapsed into one super node). Such a longer-reach access network topology eliminates operational and capital costs related routers and switches. Furthermore, a wavelength to a subscriber unit may be protected and dynamically varied for on-Demand bandwidth, information and services and also a subscriber's unit may be configured with any array of connectivity options.

37 Claims, 8 Drawing Sheets

US 8,073,331 B1

DYNAMIC INTELLIGENT BIDIRECTIONAL OPTICAL AND WIRELESS ACCESS COMMUNICATION SYSTEM

CROSS REFERENCE TO RELATED APPLICATIONS

The present application is related to and claims priority to (a) U.S. provisional patent application, "WAVELENGTH-SHIFTED DYNAMIC BIDIRECTIONAL SYSTEM," Ser. No. 60/868,838, filed on Dec. 6, 2006; (b) U.S. provisional patent application, "WAVELENGTH-SHIFTED DYNAMIC BIDIRECTIONAL SYSTEM," Ser. No. 60/883,727, filed on Jan. 5, 2007; and (c) U.S. provisional patent application, "INTELLIGENT INTERNET DEVICE," Ser. No. 60/970,487, filed on Sep. 6, 2007. These U.S. provisional patent applications are hereby incorporated by reference in their entireties.

FIELD OF THE INVENTION

The present invention relates to dynamic intelligent bidirectional optical and wireless access communication system.

SUMMARY OF THE INVENTION

According to one embodiment of the present invention, a wavelength-shifted dynamic intelligent bidirectional access optical system utilizes key optical elements such as: a quantum dot-enabled semiconductor optical amplifier, a phase modulator and an intensity modulator to provide upstream optical signals. These key optical elements reduce the Rayleigh backscattering effect on the transmission of optical signals. Reduced Rayleigh backscattering effect enables a longer-reach access network topology (more than any other current access network topology) between a subscriber unit and a super node (a super node includes many local nodes). Such a longer-reach access network topology eliminates operational costs and capital costs related to a vast array of middle equipment like routers and switches, which would otherwise be needed between super nodes and many remote nodes.

In another embodiment of the present invention, a wavelength to a subscriber unit may be protected and dynamically varied for on-Demand bandwidth, information and services.

In another embodiment of the present invention, integrated micro-processors, wireless devices, wireless sensors, RFID (radio frequency enabled identification) sensors and batteries are incorporated into an intelligent device, which may be used to sense the environment, process information, initiate action and communicate with other similar devices. Data interpretation, pattern recognition and reasoning technologies may also be utilized. Such independent interactions with other similar devices (which are integrated with micro-processors, wireless devices, wireless sensors, RFID sensors and batteries) with or without human interactions enables the Internet of Things and/or machine-to-machine communication via embedded algorithms/software.

The present invention is better understood upon consideration of the detailed description below and the accompanying drawings.

DETAILED DESCRIPTION OF THE PREFERRED EMBODIMENTS

Figure 1:
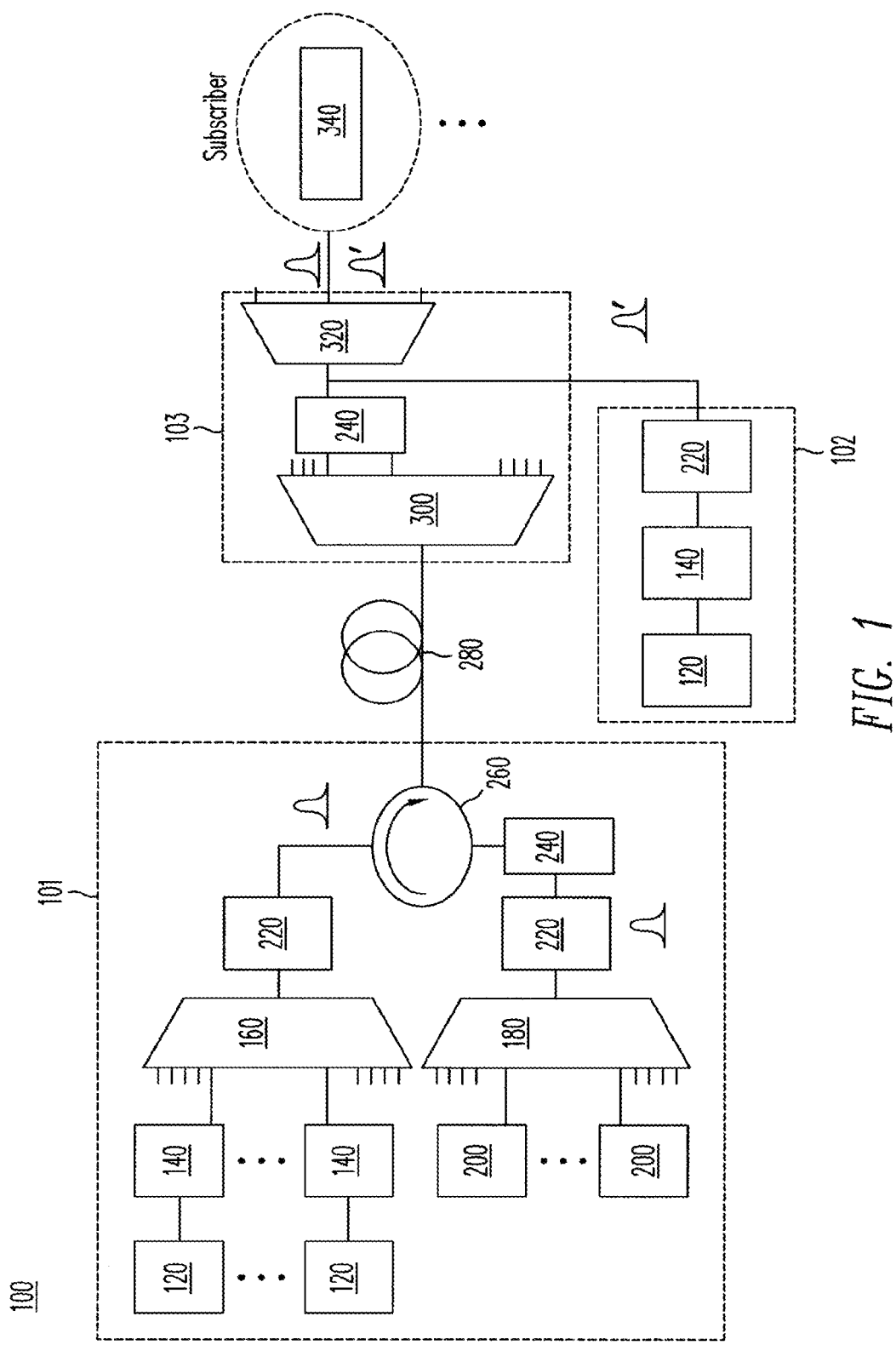
FIG. 1 shows an access optical network 100, according to one embodiment of the present invention.

FIG. 1 shows an access optical network 100, which is a wavelength-shifted dynamic bidirectional system, includes a super node 101, many local nodes 102 and many remote nodes 103.

An optical network 100 connects to many local nodes 102, many remote nodes 103 and a large number of subscriber units 340. At a super node 101, a number of fast switching wavelength stabilized tunable lasers 120 provide specific downstream optical signals of selected distinct wavelengths, each selected distinct wavelength being modulated by the corresponding modulators 140. The modulated wavelengths are then combined by wavelength combiner 160 and amplified by an erbium-doped fiber amplifier (EDFA) 220. The amplified wavelengths pass through a circulator 260 to be transmitted on a dispersion-compensated, single-mode optical fiber 280 to a remote node 103.

The modulated wavelengths (optical signals) are transmitted over a dispersion-compensated single-mode optical fiber 280 and then are decombined by a wavelength combiner/decombiner 300 in a remote node 103 and filtered by a tunable optical bandpass filter 240 in order to recover the selected distinct wavelengths (optical signals). The filtered wavelengths are then further decombined by an optical power combiner/decombiner 320 and are sent to multiple subscriber units 340.

Also at a local node 102 includes fast switching wavelength stabilized tunable lasers 120, which provide optical signals of selected distinct wavelengths that are each offset from the corresponding set of selected distinct wavelengths generated at a super node 101. These selected distinct offset wavelengths at local node 102 are modulated by modulators 140 and amplified by an erbium-doped fiber amplifier (EDFA) 220. The selected amplified distinct wavelengths (optical signals) transmit through an optical power combiner/decombiner 320 and are sent to multiple subscriber units 340 for upstream optical signals.

The upstream optical signals are returned through an optical power combiner/decombiner 320, a tunable optical bandpass filter 240, and a wavelength combiner/decombiner 300.

The upstream optical signals are transmitted over a dispersion-compensated single-mode optical fiber 280 to a circulator 260 of a super node 101.

A circulator 260 provides the wavelengths to a tunable optical bandpass filter 240, an erbium-doped fiber amplifier (EDFA) 220 and a wavelength decombiner 180 for detection by a larger number of avalanche photodiodes 200 for each distinctly selected wavelength (optical signal).

Figure 2:
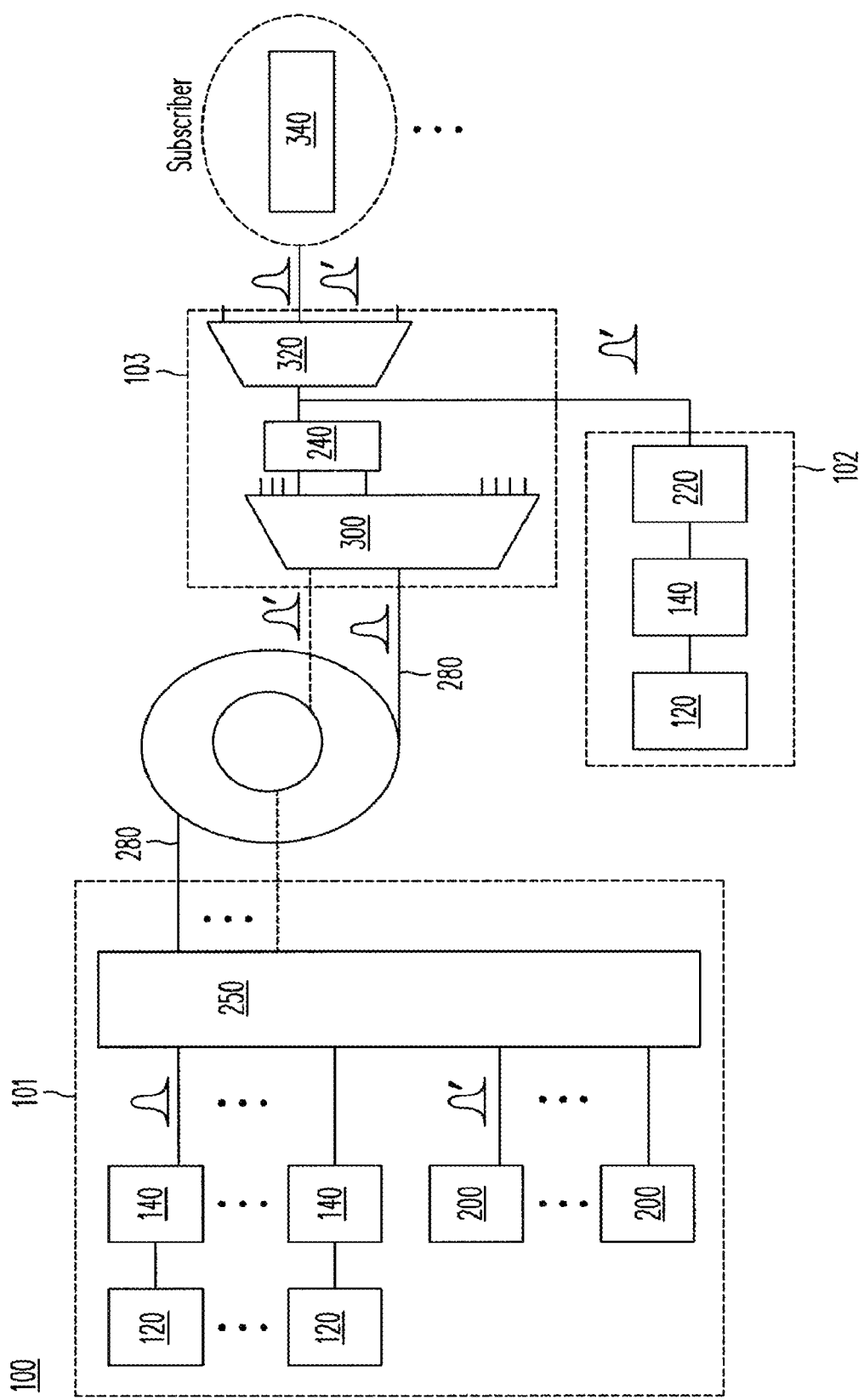
FIG. 2 shows an access optical network 100 where a wavelength to a subscriber unit 340 can be protected and dynamically varied for on-Demand bandwidth, information and services.

FIG. 2 shows an optical network 100 where a wavelength to a subscriber unit 340 can be dynamically varied utilizing M:M cyclic arrayed waveguide grating router(s) 250. Also a wavelength to and from a subscriber unit 340 can be protected by a 2×2 optical switch (not shown in the FIG. 2). Downstream and upstream optical signals can be separated via a ring network topology of single-mode optical fibers 280, according to one embodiment of the present invention.

All possible switched output wavelengths of the fast switching wavelength stabilized tunable lasers 120 are arranged or displayed at the M outputs of the M:M cyclic arrayed waveguide grating router 250 because of the free spectral range periodic property of the M:M cyclic arrayed waveguide grating router 250. The M:M cyclic arrayed waveguide grating router 250 offers the flexibility of routing more than one wavelength to any subscriber unit 340 for on-demand bandwidth, information and services.

Figure 3A:
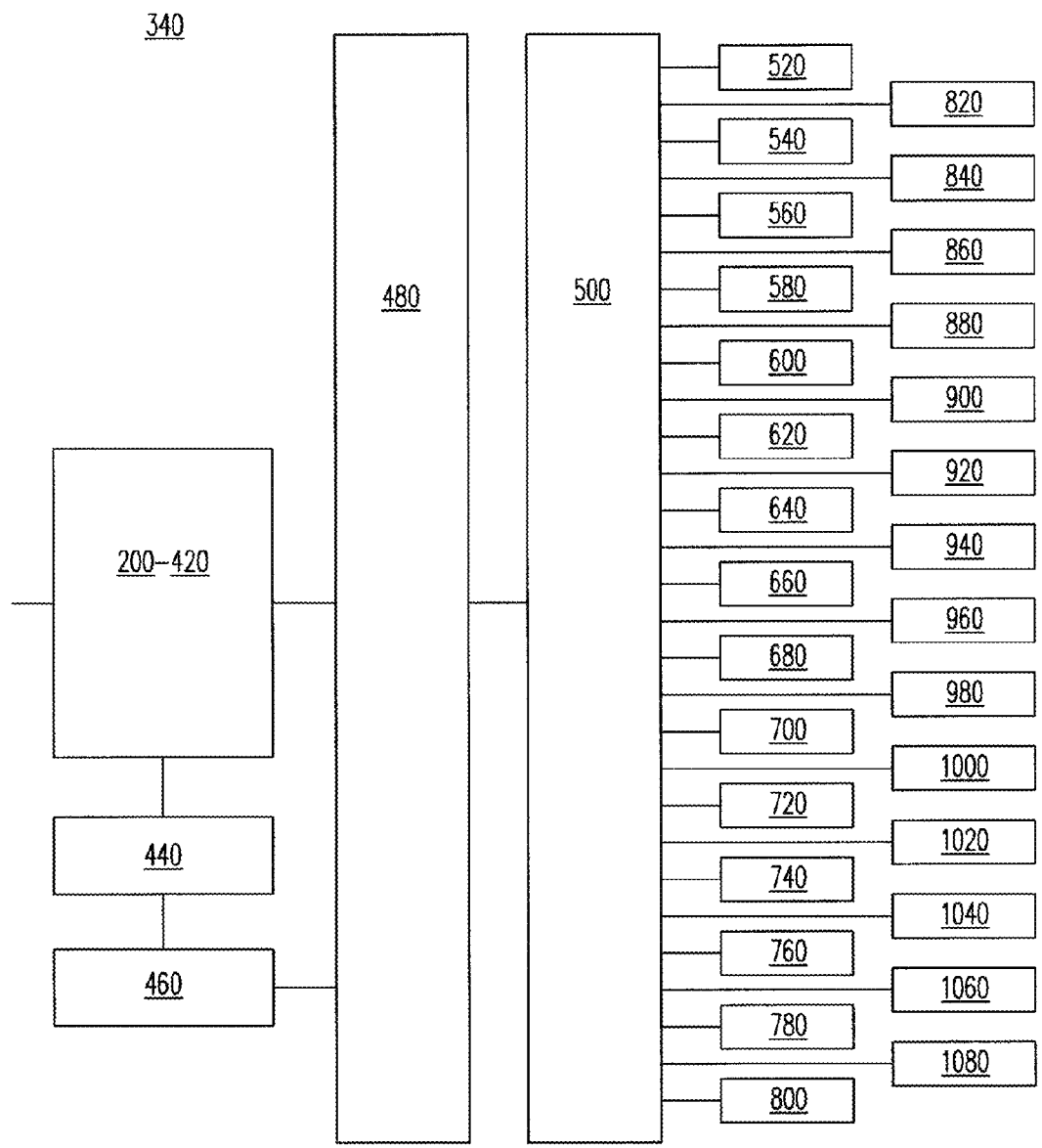
FIG. 3A shows an optical and wireless configuration of a subscriber unit 340 enabling the Internet of Things and/or machine-to-machine communication.
Figure 4:
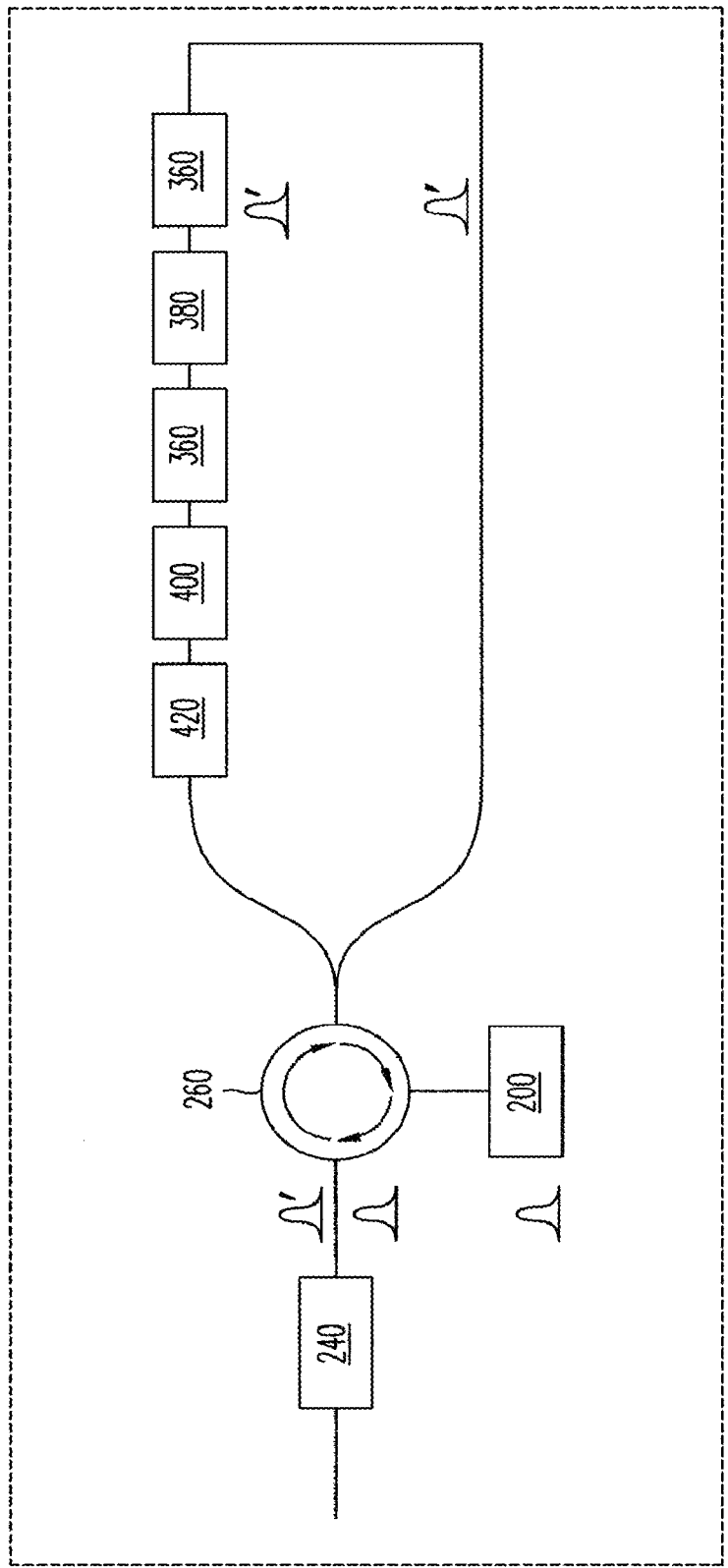
FIG. 4 shows an exemplary processing of optical signals utilizing optical components 200-420.
Figure 5:
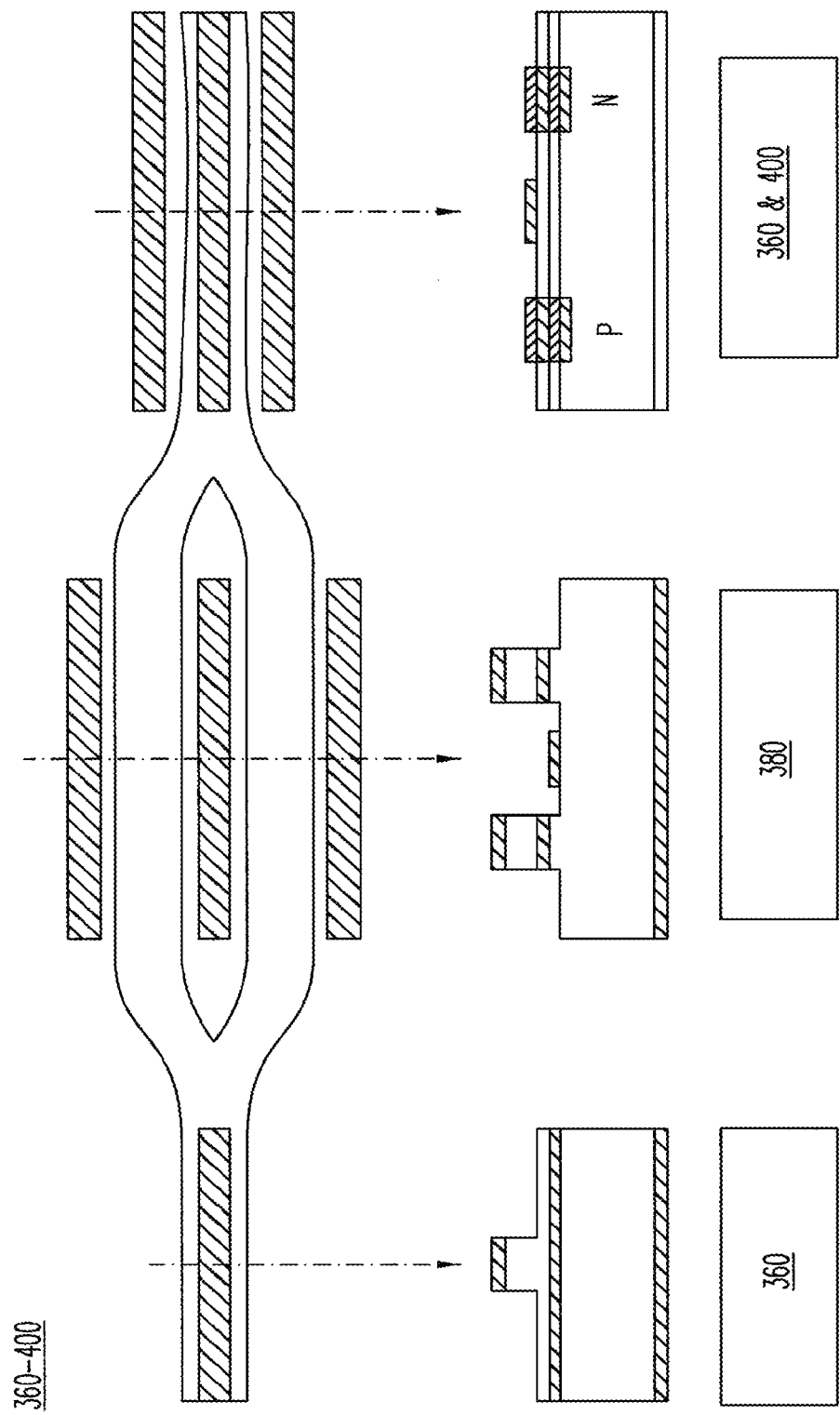
FIG. 5 shows an integrated cross-sectional implementation of two quantum dot enabled semiconductor optical amplifiers 360, a phase modulator 380 and an intensity modulator 400 as described by FIG. 4.

FIG. 3A shows an exemplary configuration of a subscriber unit 340, according to one embodiment of the present invention. As shown in FIGS. 3A, 4 and 5, a subscriber unit includes a tunable optical bandpass filter 240, an avalanche photodiode 200, a circulator 260, optical processing components 360-420, an electrical to optical amplifier circuit 440, an avalanche photodiode circuit 460 and a media access and algorithm flow/quality of service (QoS) management controller 480.

More than ever before, we are more mobile and more global. Our ability to access any content, any time and from any place is critical. A converged pervasive always-on Internet will be the global network of human connections, ideas, collaboration, commerce and distributed intelligence. Therefore, an intelligent device that allows access of any content over the Internet is desirable with or without human intervention.

According to another embodiment of the subscriber unit 340, an intelligent device (which is based on emerging convergence of numerous platforms, for example: computing, communication, device to device communication, sensory input processing, entertainment, medicine, artificial intelligence and Internet of Things and/or machine-to-machine communication, enabling self learning with or without human intervention) may include a micro-processor device, an operating system/software and various embedded software for operation, control and management, one or more Internet access devices, a display device, a keyboard device, a storage device, a battery, a power management device, a voice/video/data over Internet protocol device, a multimedia device, a GPS device and a near-field communication device.

Benefits of Such a Device

Simple[1] to use

[1] "If one can package it in a way that's easy—brainlessly easy—for the end user, that's when things are really going to take off".

Intelligent

Convergent (of computing, communication and cable TV network platforms)

Open hardware and software architectures

Seamless communication over Internet protocol

Capable of time shifting any content

Capable of place shifting any content

Capable of location recognition for navigation

Capable of searching physical things via RFID reading device and GPS

Capable of the Internet of Things and/or machine-to-machine communication

Capable of remote control of life and health

Capable of nano-medicine based diagnostics

Potentially a disruptive business model based on emerging convergence of numerous platforms, for example: computing, communication, entertainment, medicine, artificial intelligence/fuzzy logic and Internet of Things and/or machine-to-machine communication. Thus it enables an intelligent system for self learning with or without human intervention.

As shown in FIG. 3A, a media access and algorithm flow/quality of service (QoS) management controller 480 multiplexes/demultiplexes the electrical or optical signals to a number of connectivity devices for various applications, incorporating an IP address (500); a microprocessor device (520); an operating software/system (540); an Internet access device (560); an Internet firewall including spyware, parental and security (e.g., finger-print recognition and retinal scan) control capabilities (580); a display device, or a stretchable nano-technology based display device or an organic light emitting display (600); a keyboard, a stretchable keyboard device, a touch screen keyboard, a infrared illuminated keyboard or a voice activated keyboard (620); a battery, a nano-technology based solar cell, or a wireless charger (640); a storage device, a holographic storage device, or an Internet enabled storage device (660); a microphone device (680); a camera (700); a video compression device (720); a GPS device (740); a projection display device (760); an MMIC (millimeter wave IC) or UWB (ultra wideband) or NG (Next Generation) wireless connection device or Wi-Max connection device or WIFI connection device (780); a Bluetooth device (800); a RFID reading device (820); a near-field communication device (840) for any point-of-purchase; a remote connection and content transfer device (860) from phone to computer to TV; an in-situ diagnostic and a remote control device (880); a web-based content management device (900) for place shifting; an artificial intelligence or pattern recognition-based device (920) for interpreting user profiles and preferences; an artificial intelligence or fuzzy logic-based device for automatic searches, recommendations, suggestions and fetching of content (940); a voice-over-Internet protocol device (960); a video-over-Internet protocol device (980); a data-over-Internet protocol device (1000); and a device integrated with micro-processors, wireless devices, wireless sensors, RFIDs and batteries and embedded algorithm (1020) enabling the Internet of Things and/or machine-to-machine communication.

Such an intelligent device may be connected to a digital gateway/broadband router (1040), a set-top box (1060) and a personal video recorder (1080) via a sensor, a wired connection, or a wireless connection. The combinations of various capabilities of many devices incorporated into an intelligent device create many novel consumer applications. For example, having an Internet access device (560), a GPS device (740) and an RFID reading device (820) incorporated into such an intelligent device allows a new application of physical search. As many products have RFID tags, an RFID reading device (820) of an intelligent device may be used to retrieve the RFID information and other embedded content from a product when a consumer encounters the product. The consumer may then further search all non-confidential product information, including, availability, pricing and distribution via the Internet. Using a GPS device (740) in the intelligent device may even locate distribution locations where the same product can be purchased, ranked according to price. Other applications are possible because of the seamless capabilities provided on the intelligent device.

By utilizing an ultra-high resolution and very high contrast ratio touch sensitive monochrome or color display and a stylus; an electronic sketchpad may be created.

An intelligent device of the present invention may have many radios and antennas. The wireless capabilities can be further simplified by a software-defined radio, where a radio, controlled by software, utilizes a broadband antenna and a carbon-nanotube tunable radio-frequency cavity filter to access or tune to a wide range of frequencies, instead of a single band.

An intelligent device of the present invention may be designed for short-range communication. The intelligent device may enable the device to act like a node in a wireless-sensor network, having more power and processing capabilities than the other sensors, and collect information about the environment (e.g., pictures or location information). The intelligent device may also aggregate data from nearby sensors, process such information, and send such information to other sensors, devices, and intelligent devices via wired, wireless or sensor networks.

Moreover, home sensors (e.g., built-in security sensors, utility sensors and moisture sensors), infrared sensors and health sensors may be also connected or incorporated.

Figure 3B:
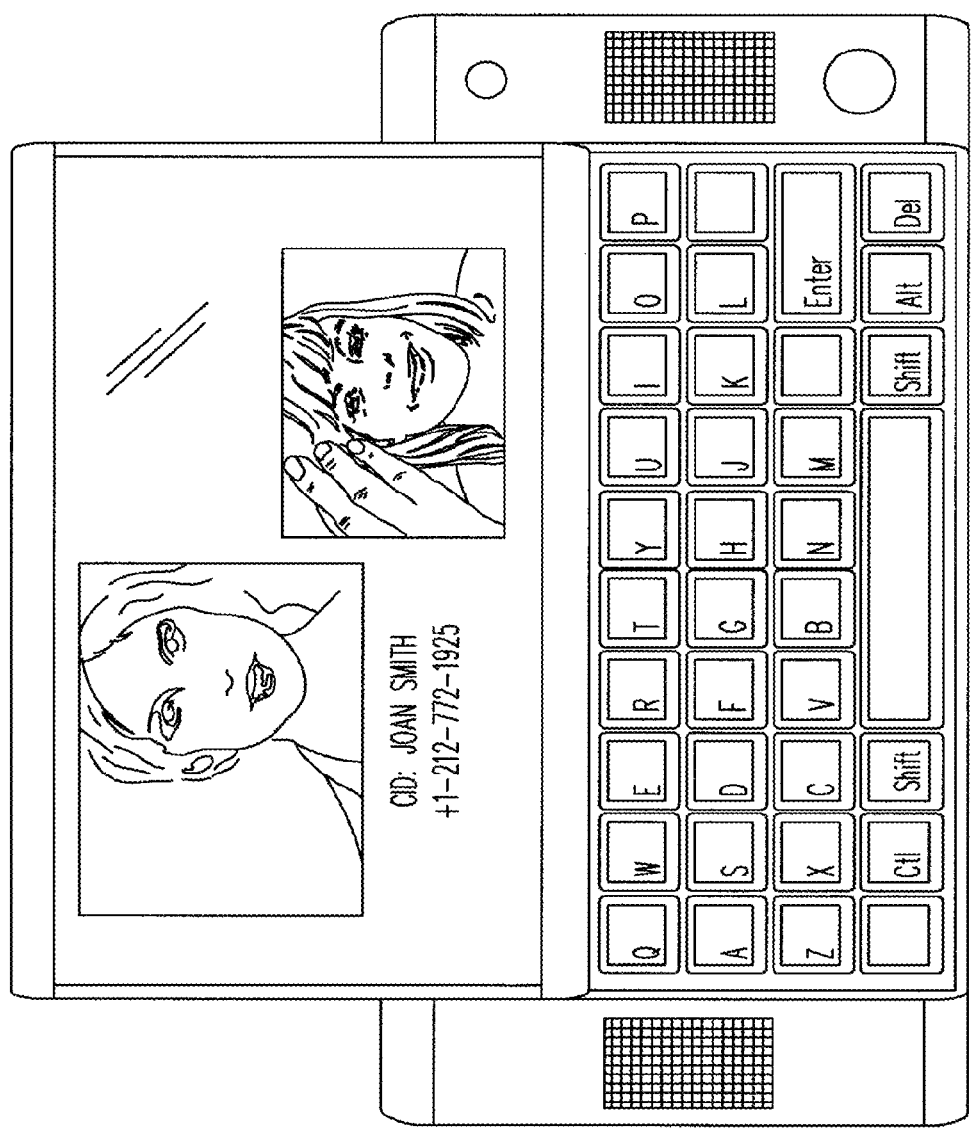
FIGS. 3B and 3C show two perspectives of an exemplary application of such an Internet appliance connected wirelessly or wired to a subscriber unit 340.
Figure 3C:
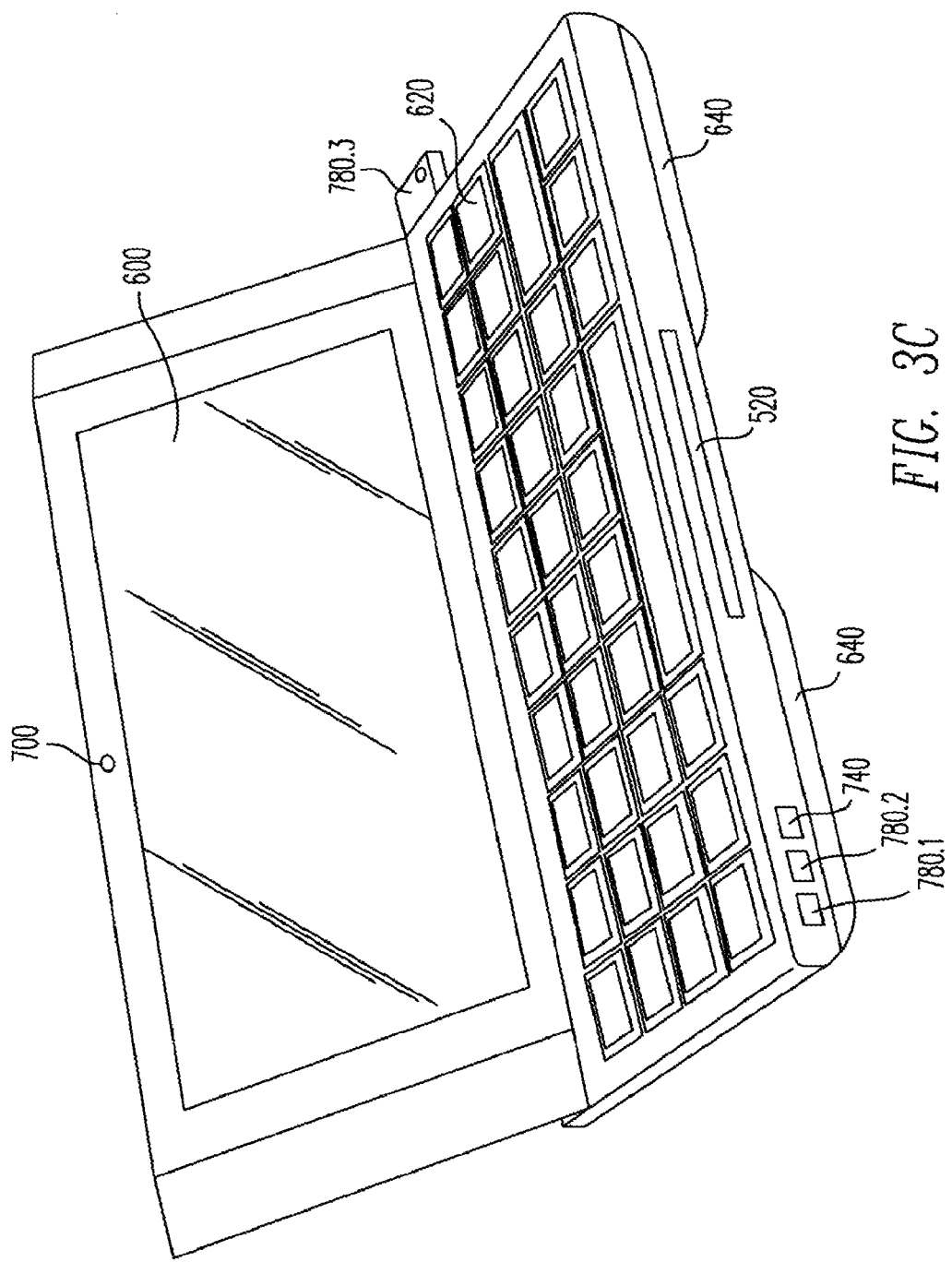
Figure 3D:
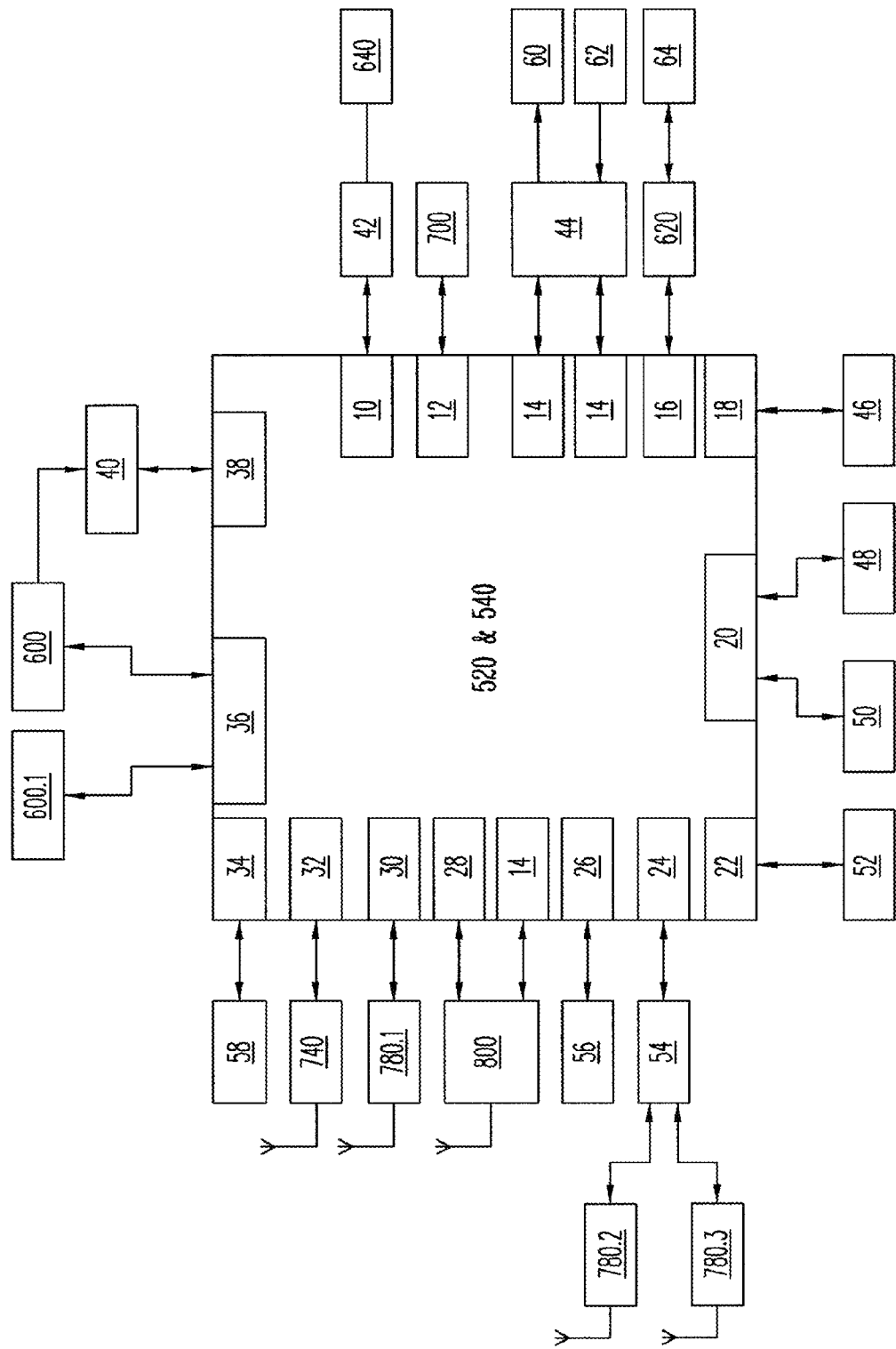
FIG. 3D shows an exemplary circuit block diagram of an Internet appliance connected wirelessly or wired to a subscriber unit 340.

As shown in FIG. 3B and FIG. 3C, an intelligent device of the present invention allows a user to make telephone calls, send instant video messages, send instant messages, send instant pictures, watch TV programs, play games and send medical diagnostics over the Internet and utilize it as a mobile nano-computer at any time and from any place. This also can securely store financial information such as credit card information and reduce any further need for keeping separate financial information. Near-field communication device(s) along with an RFID reading device incorporated into an intelligent device may allow, for example, payment at any point-of-purchase. This is an open and flexible architecture in hardware and software. A design example with a circuit block diagram is shown in FIG. 3D, where a microprocessor device (520) controlled by an operating software/system software (540) is connected to various components as: 10 (power reset), 12 (camera controller), 14 (McBSP connection), 16 (GPIO connection), 18 (MS/MMC/SD/SDIO connection), 20 (Memory controller), 22 (Storage controller), 24 (USB connection), 26 (USB OTG connection), 28 (UART connection), 30 (SDIO connection), 32 (I2C connection), 34 (IrDA connection), 36 (Display controller), 38 (SPI connection), 40 (Touch screen display controller), 42 (Power management chip), 44 (Audio code), 46 (Micro SD slot), 48 (Mobile DDR), 50 (NAND/NOR Flash), 52 (HHD), 54 (USB hub), 56 (Mini USB hub), 58 (FIR port), 60 (Speaker), 62 (MIC), 64 (Headset), 600 (Display), 600.1 (External display), 620 (Keyboard), 640 (Battery), 700 (Camera), 740 (GPS module), 780.1 (WLAN module), 780.2, (WiMax module), 780.3 (Next Generation wireless module) and 800 (Bluetooth module).

Integrated micro-processors, wireless devices, wireless sensors, RFID sensors, and batteries incorporated into an intelligent device may be used to sense the environment, to process information, to initiate action and to communicate with other similar devices. Data interpretation, pattern recognition and reasoning technologies may be utilized to allow these devices to communicate with and/or without human intervention and to operate independently and intelligently. Such independent interactions with other similar devices (which are integrated with micro-processors, wireless devices, wireless sensors, RFID sensors and batteries incorporated can enable the Internet of Things and/or machine-to-machine communication via embedded algorithms.

For example, holographic images of DNA stored in an intelligent device could be projected in a physical space or on the Internet to enable a physician to design personalized medical or surgical treatment. Such an intelligent device can be self-learning and enable the remote-control for life and health (via, for example, nanotechnology-based in-situ implanted medical sensors and web based medicine).

FIG. 4 shows an exemplary processing of optical signal processing in components 200-420. As shown in FIG. 4, downstream optical signals are divided by a tunable optical bandpass filter 240 to an avalanche photodiode 200 for receiving optical signals. Upstream optical signals with the slightly offset distinctly selected wavelengths are provided to a tunable optical bandpass filter 240, which forwards the filtered optical signals to a circulator 260. The upstream optical signals are looped back through a quantum dot enabled semiconductor optical amplifier 360 and a phase modulator 380. The phase-modulated optical signals are further amplified by a quantum dot enabled semiconductor optical amplifier 360 and modulated in intensity by an intensity modulator 400. Both phase and intensity modulated optical signals are then transmitted through a variable optical intensity attenuator 420 for upstream optical signals to a super node 101 through a circulator 260.

Using a quantum dot enabled semiconductor optical amplifier 360, a phase modulator 380 and an intensity modulator 400 in the manner shown in FIG. 4 to reduce the Rayleigh backscattering effect on the transmission of optical signals, thus enabling a simplified network topology to support a longer reach between a super node 101 and a remote node 103 and, thereby eliminating a vast array of middle equipment such as routers and switches, which would otherwise be needed between super nodes 101 and many remote nodes 103. Also, a pilot tone modulation may be provided to a quantum dot enabled semiconductor optical amplifier 360 at a subscriber unit 340 and a fast switching wavelength stabilized tunable laser 120 at a super node 101 to reduce any backscattering effect. Furthermore, all optical fiber connectors may be angle polished to reduce further optical back-reflection.

According to one embodiment of the present invention, an upstream wavelength may be shared among multiple subscriber units 340 (e.g., using a time division multiplexed statistical bandwidth allocation technique), hence burst mode electronics with a forward error correction may be provided at a super node 101 to process the upstream optical signals from multiple subscriber units 340, but the downstream optical signals from a super node 101 to subscriber units 340 may be transmitted under broadcast mode conditions.

In another embodiment of the present invention, burst mode electronics with a forward error correction may be provided both at a super node 101 and subscriber units 340 to process both upstream and downstream optical signals, using a time division multiplexed statistical bandwidth allocation technique.

FIG. 5 shows an exemplary integrated cross-sectional implementation of two quantum dot enabled semiconductor optical amplifiers 360, a phase modulator 380 and an intensity modulator 400, according to one embodiment in a cross-section of the present invention.

The above detailed description is provided to illustrate specific embodiments of the present invention and is not intended to be limiting. Numerous modifications and variations within the scope of the present invention are possible.

I claim:
1. An optical system for communicating optical signals to and from a subscriber unit, comprises:
    a first set of selected wavelengths;
    a second set of selected wavelengths offset from the first set of selected wavelengths;
    a first subsystem configured to transmit to the subscriber unit, the optical signals of one or more wavelengths from the first set of selected wavelengths over an optical fiber;
    a second subsystem configured to transmit to the subscriber unit the optical signals of one wavelength selected from the second set of selected wavelengths in statistical time division multiplexing over the optical fiber;
    a third subsystem at the subscriber unit configured to receive the optical signals of the one or more wavelengths from the first set of selected wavelengths and the optical signals of one wavelength from the second set of selected wavelengths over the optical fiber;
    a fourth subsystem at a head-end configured to receive looped back optical signals of one wavelength from the second set of selected wavelengths from the subscriber unit to the head-end over the optical fiber;
    a cyclic arrayed waveguide grating router capable of routing more than one wavelength to the subscriber unit; and
    a phase modulator, an intensity modulator, an amplifier and a looped back configuration within the subscriber unit.
2. An optical system as in claim 1, further comprising a 3-port circulator.
3. An optical system as in claim 1, further comprising a wavelength combiner/decombiner for wavelength combining or wavelength decombining of two or more wavelengths.
4. An optical system as in claim 1, further comprising a power combiner/decombiner for power combining or power decombining one or more wavelengths.
5. An optical system as in claim 1, further comprising a plurality of lasers and detectors.
6. An optical system as in claim 5, further comprising a plurality of wavelength-stabilized lasers.
7. An optical system as in claim 5, further comprising a plurality of tunable lasers.
8. An optical system as in claim 5, further comprising a plurality of plurality of fast-switching lasers.
9. An optical system as in claim 5, further comprising one or more components selected from the group consisting of: a photodiode, a photodiode plus linear semiconductor optical amplifier, an avalanche photodiode, a fast-switching photodiode and a tunable photodiode.
10. An optical system as in claim 5, further comprising one or more circuits selected from the group consisting of: a burst-mode circuit and a forward-error correction circuit.
11. An optical system as in claim 1, further comprising a plurality of intensity modulators for modulating light intensities from the laser sources.
12. An optical system as in claim 1, further comprising an amplifier for amplifying the modulated optical signals.
13. An optical system as in claim 12, further comprising an erbium doped fiber amplifier.
14. An optical system as in claim 12, further comprising a semiconductor optical amplifier.
15. An optical system as in claim 1, further comprising a cyclic arrayed waveguide grating router.
16. An optical system as in claim 1, wherein the subscriber unit further comprises an intensity modulator for intensity modulation of the optical signals selected from the one wavelength from the second set of wavelengths.
17. An optical system as in claim 1, wherein the subscriber unit further comprises a phase modulator for phase modulation of the optical signals selected from the one wavelength selected from the second set of wavelengths.
18. An optical system as in claim 1, wherein the subscriber unit further comprises a quantum dot-enabled semiconductor optical amplifier for amplifying intensity modulated optical signals selected from one wavelength from the second set of wavelengths.
19. An optical system as in claim 1, wherein the subscriber unit further comprises a quantum dot-enabled semiconductor optical amplifier for amplifying phase modulated optical signals selected from one wavelength from the second set of wavelengths.
20. An optical system as in claim 1, wherein the subscriber unit further comprises a circulator for looping back the optical signals of one wavelength of the second set of wavelengths, after optically processing said looped back optical signals, in the subscriber unit.
21. An optical system as in claim 1, wherein the subscriber unit further comprises a media access controller and a data flow management controller.
22. An optical system as in claim 21, wherein the subscriber unit further comprises a quality of service.
23. An optical system as in claim 21, wherein the subscriber unit further comprises a phase modulator, an intensity modulator and a quantum dot-enabled semiconductor amplifier that are fabricated on a same semiconductor substrate.
24. An optical system as in claim 21, wherein the subscriber unit is further configured to receive one or more wavelengths on demand.
25. An optical system in claim 21, wherein the subscriber unit is further configured to receive bandwidth on demand.
26. An optical system as in claim 21, wherein the subscriber unit is further configured to receive wavelength protection on demand.
27. An optical system as in claim 21, wherein the subscriber unit is further configured to transmit or receive the optical signals via a coordinated statistical time division multiplexing.
28. An optical system as in claim 21, wherein the subscriber unit further comprises an optical signal processing circuit, comprising:
    a phase modulator for modulating the optical signal;
    an intensity modulator for modulating the optical signal;
    a semiconductor optical amplifier for amplifying the optical signal; and
    a circulator for looping back optical signal over an input terminal.
29. An optical system in claim 28, further comprising an increased link distance between the subscriber unit and head-end resulting from a reduction of scattering.
30. An optical system as in claim 21, wherein the subscriber unit further comprises an embedded algorithm.
31. An optical system as in claim 21, wherein the subscriber unit further comprises an internet communicator.
32. An optical system as in claim 21, wherein the subscriber unit further comprises one or more security modules selected from the group consisting of: internet security, firewall and parental control.
33. An optical system as in claim 21, wherein the subscriber unit further comprises one or more internet protocol

(IP) modules selected from the group consisting of: voice-over-IP, video-over-IP and data-over-IP.

34. An optical system as in claim 21, wherein the subscriber unit further comprises one or more electronic modules selected from the group consisting of: a set-top box, a video recorder, a place shifter and a time shifter.

35. An optical system as in claim 21, wherein the subscriber unit further comprises one or more communication modules selected from the group consisting of: a wire, a wireless and a sensor.

36. An optical system as in claim 21, wherein the subscriber unit further comprises one or more identification modules selected from the group consisting of: radio frequency identification and an identification sensor.

37. An optical system as in claim 21, wherein the subscriber unit further comprises one or more sensor modules selected from the group consisting of: home control and health care.

* * * * *